July 19, 1949.  R. H. MARSH  2,476,749
ROTARY CUTTER
Filed Feb. 28, 1944
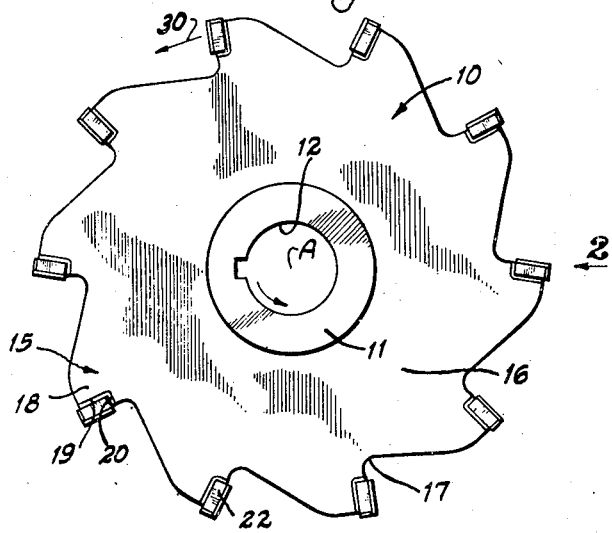
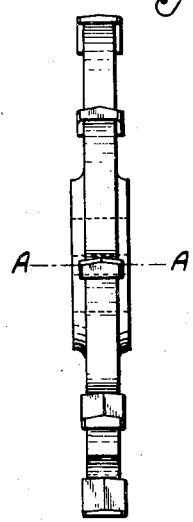
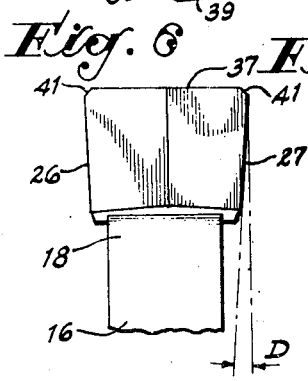
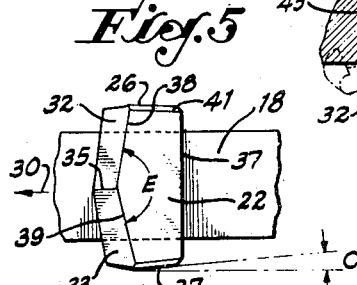
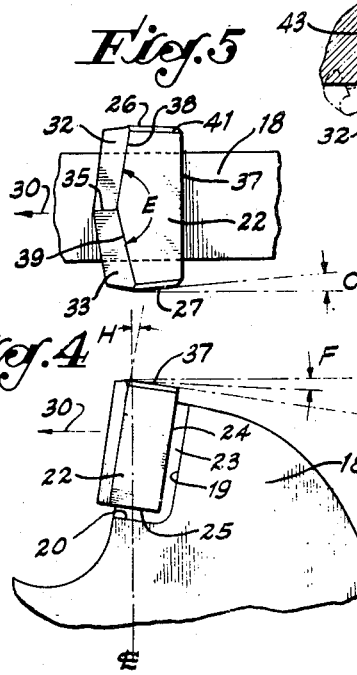
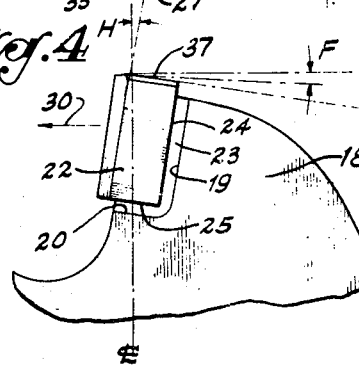
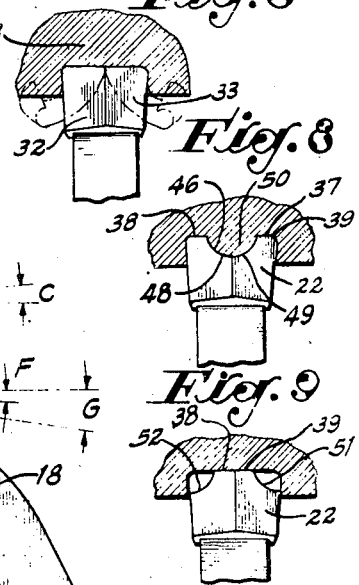
INVENTOR
ROBERT H. MARSH
BY
HARRIS, KIECH, FOSTER & HARRIS
FOR THE FIRM
ATTORNEYS Patented July 19, 1949

2,476,749

UNITED STATES PATENT OFFICE 2,476,749

ROTARY CUTTER

Robert H. Marsh, San Marino, Calif., assignor, by mesne assignments, to Super Tool Company, a corporation of Michigan Application February 28, 1944, Serial No. 524,186

3 Claims. (Cl. 29—103)

My invention relates to a rotary cutter such as a milling cutter and, more particularly, to a rotary cutter providing skewed cutting edges on each tooth disposed to substantially eliminate side thrusts on the tooth.

One form of milling cutter previously proposed is of the staggered-tooth type in which the helix angle of adjacent teeth is reversed. As each tooth engages the work, the axial or sidewise thrust on the cutter body is reversed. Correspondingly, the rotating cutter experiences a reversal in thrust each time a new tooth starts to cut, with the result that the cutter body is in constant vibration and each tooth is subjected to net axial or sidewise thrusts.

It is an object of the present invention to provide a rotary cutter having a plurality of teeth, each tooth being so designed that it is not subject to substantial sidewise thrust during the cutting operation.

Another object of the invention is to provide a novel rotary cutter capable of operating at high speed, and in which the cutting elements are formed of a hard cutting material, such as tungsten carbide, these cutting elements being secured to the body of the cutter.

In its preferred embodiments, the invention includes a body providing a plurality of teeth disposed around the axis of rotation of the body, each tooth providing two skewed or helical cutting edges of substantially equal length and disposed at substantially equal angles with respect to the direction of forward advancement of the tooth during the cutting operation. Such skewed cutting edges are provided at the intersection of two forward faces with an end or peripheral face of the tooth. The invention comprehends that these forward faces shall be disposed at an obtuse angle with respect to each other. The invention includes among its objects the provision of a rotary cutter employing one or more of the above features.

Further objects and advantages of the invention will be apparent to those skilled in the art from the following description of two exemplary embodiments, illustrated with reference to a milling cutter.

Referring to the drawing:

Figure 1 is a face view of a slotting-type milling cutter;

Figure 2 is an end view thereof, taken in the direction of the arrow 2 of Figure 1;

Figure 3 is a diagrammatic view, taken toward an advancing tooth and illustrating the approximate direction of chip curl;

Figure 4 is an enlarged face view of one of the teeth on the cutter shown in Figure 1;

Figure 5 is a top view of the tooth shown in Figure 4;

Figure 6 is a face view of the tooth shown in Figure 4;

Figure 7 is a top view, similar to Figure 5, but showing an alternative embodiment of the invention; and Figures 8 and 9 are diagrammatic views illustrating another embodiment of the invention in cutting relationship with an object, these views respectively representing face views of adjacent teeth.

Referring particularly to Figures 1 to 6, inclusive, the embodiment of the invention therein-shown includes a rotary cutter 10 providing a hub portion 11 drilled and slotted in a conventional manner to provide an arbor-receiving opening 12. This cutter is adapted to rotate about an axis A—A, and provides sectional teeth 15 disposed around the axis of rotation and joined with the hub portion 11 by a disc portion 16.

In its preferred embodiment, the periphery of the disc portion 16 is notched to provide clearance depressions 17 separated by tooth members 18, and the forwardly-facing portions of the latter are preferably grooved to provide a forward wall 19 and an inner wall 20. A cutting element 22 is brazed, welded, or otherwise secured in each notch. In Figures 1 and 4, the layer of brazing material 23 is shown, somewhat exaggerated in size for purpose of clarity, as joining the forward wall 19 to a rear wall 24 of the cutting element and as joining the inner wall 20 with an inner wall 25 of the cutting element. As best shown in Figures 2, 5, and 6, the axial width of each cutting element 22 is greater than the width of the disc portion 16 or the tooth member 18 so that the sides of each cutting element 22 overhang the tooth member 18 to which it is attached. In addition, the side surfaces of each cutting element, indicated by the numerals 26 and 27, are preferably tapered inwardly in a rearward direction to provide side clearance, indicated by the angle C of Figure 5, these surfaces being also tapered inwardly in an axial direction to provide a small angle D of face concavity, shown in Figure 6. These angles are not critical, being usually only a matter of a degree or so but being sufficiently large to provide the desired clearance. During the time that each tooth moves in cutting relationship with the object to be cut, it moves in a forward direction, indicated for example by the arrow 30 of Figures 1, 4, 5, and 7.

Each cutting element 22 provides two forward faces 32 and 33, and it is an important feature of the invention that these faces shall be disposed at an obtuse angle with respect to each other. For example, in the embodiment of Figure 5, the obtuse angle is indicated at E, though it should be clear that the complementary angle is also obtuse. In the preferred embodiment of the invention, these forward faces present a forwardly-convex cutting surface, the forward faces 32 and 33 meeting at an apex or ridge line 35. In the type of cutter shown, this ridge line represents the forward crest of the cutting element and lies in a plane perpendicular to the axis of rotation A—A.

The forward faces 32 and 33 extend outwardly to intersect an end face 37 of the cutting element to form sharp skewed or helical cutting edges 38 and 39. These cutting edges should be of substantially equal length and they should extend at substantially equal angles with respect to the direction of forward advancement of the tooth, indicated by the arrow 30. In the type of cutter herein-illustrated, a plane substantially bisecting the obtuse angle E between the forward faces 32 and 33 will contain a line corresponding substantially to or representing the direction of forward advancement of the tooth. In fact, a radial plane passing through the ridge line 35 will bisect the obtuse angle E.

The end face 37 of each tooth or cutting element provides appropriate clearance to the rear of the cutting edges 38 and 39. In the construction shown in Figures 4 and 5, that portion of the end face 37 just rearward of the cutting edges 38 and 39 is provided with a small primary clearance, indicated by the angle F, while the remaining portion of the end face 37 is ground to provide a larger secondary clearance, indicated by the angle G. A 3° primary clearance and an 8° secondary clearance are usually quite satisfactory, although the invention is not limited to these values nor to the use of two clearance angles. The edges of the cutting element 22 at the sides of the end face 37 may be relatively sharp or beveled, as indicated by the numeral 41, depending upon the cut to be made. The cutter may be formed with a positive or negative rake, and very satisfactory operation will be obtained in either instance depending upon the material being cut. In the embodiment shown, a negative-rake tooth is indicated, the rake angle being shown by the letter H in Figure 4.

It should be understood that the invention comprehends either a sectional tooth 15, in which a separate cutting element 22 provides the cutting edges 38 and 39, or a tooth integral with the remainder of the cutter and providing suitably hardened cutting edges 38 and 39 thereon. In the former instance, the cutting element 22 is made of any suitable hard cutting material, such as tungsten carbide with or without other carbides, high-speed steel, Stellite (a tungsten-chromium-cobalt alloy), etc. These materials are exceptionally hard and provide very excellent cutting edges. The general procedure is to groove the blank of the cutter, braze the cutting elements in place before they are finished to the shape shown, and then grind the end face 37, the side surfaces 26 and 27, and the forward faces 32 and 33, employing silicon carbide wheels for rough grinding and diamond wheels for the finish grinding.

It will be apparent that, as any particular tooth of the cutter thus far described advances in cutting relationship with an object 43 to be cut (see Figure 3), the cutting edges 38 and 39 will exert a shearing action on the material. Due to the skewed or helical nature of these cutting edges, each cutting edge will be subjected to a sidewise or axial thrust but, as the length of the two cutting edges is substantially equal and as the angle of skew of each cutting edge is equal, it follows that these sidewise thrusts are equal and opposed so as to cancel each other. Correspondingly, there is no net sidewise or axial thrust on any of the teeth, and the cutter body is not subjected to sidewise oscillation. This insures longer life and a more accurate cutting operation, particularly when the cutter is employed for producing a groove in the object 43. It will be apparent, also, that the angular relationship between the cutting edges 38 and 39 will tend to cause the chips to discharge in directions diverging from each other, as indicated in Figure 3. This is very advantageous as the chips from a particular tooth are thrown sidewise and out of the path of the succeeding tooth.

An alternative form of the invention is indicated in Figure 7. Here, the forward faces 32 and 33 are also disposed at an obtuse angle E, but these faces present a forwardly-concave surface. The tooth construction is otherwise substantially the same as that previously described. When employing this form of the invention, it will be apparent that any sidewise forces, produced by moving the cutting edges 38 and 39 in cutting relationship with an object, are equal and opposite so that the tooth is not subjected to any net sidewise or axial thrust. However, when employing this embodiment of the invention, the chips from each cutting edge will converge toward each other. While the embodiment of Figures 1 to 6 is usually preferable when cutting harder materials such as steel, the embodiment of Figure 7 can often be used to advantage in high-speed cutting of softer materials, such as aluminum, magnesium, or any of the softer alloys.

In some instances, it is desirable to shape adjacent teeth to cut different configurations. Thus in Figure 8, the cutting element 22 is shaped similar to that described with reference to Figures 1 to 6, except that the end face 37 provides a circumferential groove 46, leaving the skewed cutting edges 38 and 39 at the sides of the cutting element and providing additional arcuate cutting edges 48 and 49. It will be quite apparent that any sidewise thrust on these cutting edges 48 and 49 will be equal and opposite so that the cutting element will be subjected to no net sidewise thrust. Correspondingly, this type of cutting element can be used to cut a groove of the configuration suggested in Figure 8 and including a central rib 50. The adjacent, or a succeeding, cutting element 22 is shaped as suggested in Figure 9. Here, the cutting element is of the same shape as that previously described with reference to Figures 1 to 6 except that grooves 51 and 52 are formed at the extreme sides of the cutting element so that the remaining skewed cutting edges 38 and 39 are in the central portion of the cutting element and serve to remove the central rib 50 left by a previous tooth. In this manner, a groove can be increased incrementally in depth by the joint action of two teeth, and this operation is desirable in some machine operations.

Various changes and modifications can be made without departing from the spirit of the invention as defined in the appended claims.

I claim as my invention:

1. In a rotary cutter, the combination of: a body providing an axis of rotation and a plurality of teeth disposed around this axis, each tooth providing two skewed cutting edges of substantially equal length disposed substantially equidistant from said axis of rotation and disposed at substantially equal angles with respect to the direction of forward advancement of the tooth to eliminate sidewise thrust on the tooth while moving in cutting relationship with the object to be cut, said cutting edges diverging sidewardly and rearwardly with respect to said direction of forward advancement of the tooth.

2. In a rotary cutter, the combination of: a body providing an axis of rotation and a plurality of teeth disposed around this axis, each tooth having an end face and two forward faces disposed at an obtuse angle with respect to each other and intersecting said end face to provide two cutting edges substantially equidistant from said axis of rotation and disposed obtusely with respect to each other to diverge sidewardly and rearwardly with respect to the direction of forward advancement of the tooth, a plane substantially bisecting the obtuse angle between the forward faces containing a line representing the direction of forward advancement of the tooth while in cutting relationship with an object to be cut, and the length of the two cutting edges of each tooth being substantially equal whereby movement of each tooth in said direction of forward advancement and in cutting relationship with said object will produce substantially no net sidewise thrust on the tooth.

3. In a rotary cutter, the combination of: a plurality of peripherally spaced teeth each providing an end face, two forward faces disposed at an obtuse angle with respect to each other and intersecting in a radial plane perpendicular to said axis and bisecting said obtuse angle, and a circumferential groove formed in said end face and cooperating with said forward faces in providing arcuate cutting edges, said forward faces intersecting with said end face to provide cutting edges of substantially equal length on opposite sides of said circumferential groove and extending at an obtuse angle with respect to each other; and a plurality of supplemental teeth respectively spaced between said first-named teeth and each providing an end face, two forward faces disposed at an obtuse angle with respect to each other, said radial plane bisecting said last-named obtuse angle, and two circumferential grooves formed at the extreme sides of each supplemental tooth, said two spaced grooves intersecting the forward faces of this supplemental tooth to provide arcuate cutting edges, the two forward faces of this supplemental tooth intersecting the end face thereof to provide two obtusely-disposed cutting edges between said spaced grooves and of equal lengh on opposite sides of said radial plane.

ROBERT H. MARSH.

REFERENCES CITED

The following references are of record in the file of this patent:

UNITED STATES PATENTS

| Number | Name | Date |
|---|---|---|
| 349,475 | Barclay | Sept. 21, 1886 |
| 889,829 | Valentine et al. | June 2, 1908 |
| 1,037,146 | Hunter | Aug. 27, 1912 |
| 1,319,714 | Laurenz | Oct. 28, 1919 |
| 1,529,917 | Redinger | Mar. 17, 1925 |
| 1,621,226 | Welter | Mar. 15, 1927 |
| 1,761,755 | Smith | June 3, 1930 |
| 2,178,589 | Kraus | Nov. 7, 1939 |
| 2,328,493 | Reaney | Aug. 31, 1943 |
| 2,344,955 | Aber | Mar. 28, 1944 |
| 2,346,343 | Aber | Apr. 11, 1944 |
| 2,350,974 | Grayson | June 6, 1944 |
| 2,411,784 | Goldsmith | Nov. 26, 1946 |

FOREIGN PATENTS

| Number | Country | Date |
|---|---|---|
| 286,821 | Germany | Sept. 1, 1915 |
| 298,164 | Germany | June 1, 1917 |